July 21, 1925.

G. S. GAYLORD 1,546,725

MACHINE FOR PREPARING COATED CARTON PARTS FOR GLUING

Filed May 29, 1924     6 Sheets-Sheet 1

Inventor:
George S. Gaylord
By Cheever & Cox
Attys.

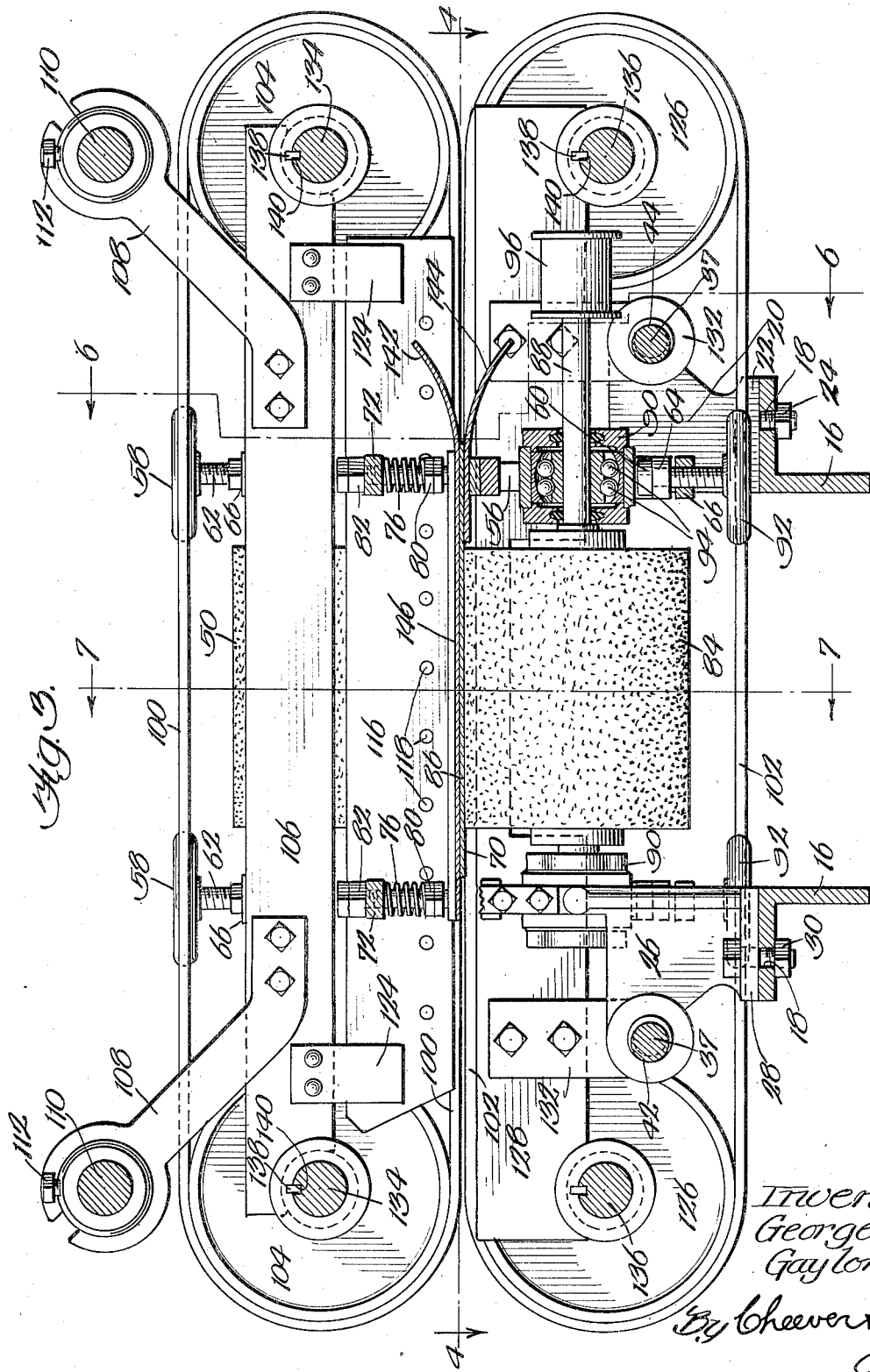

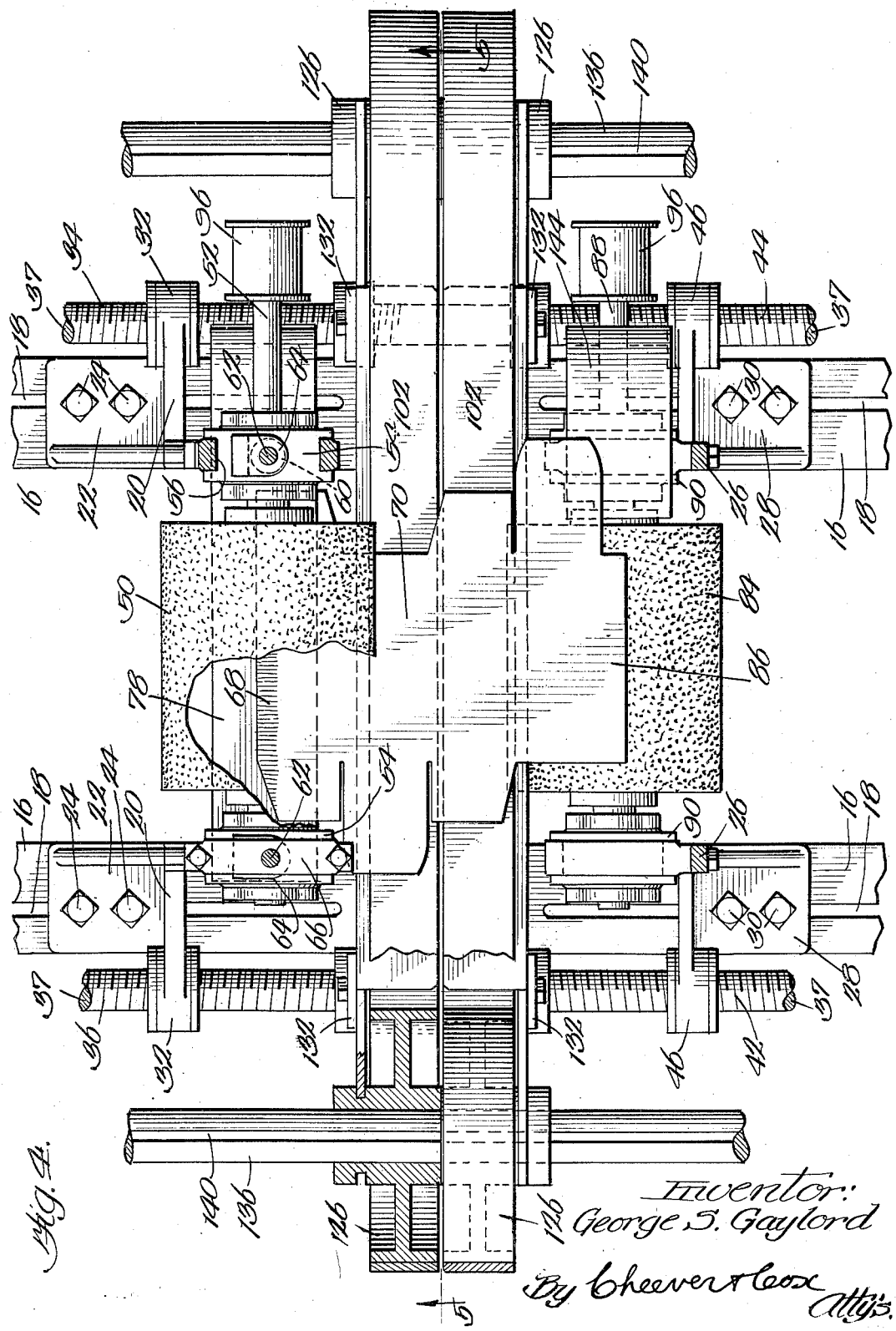

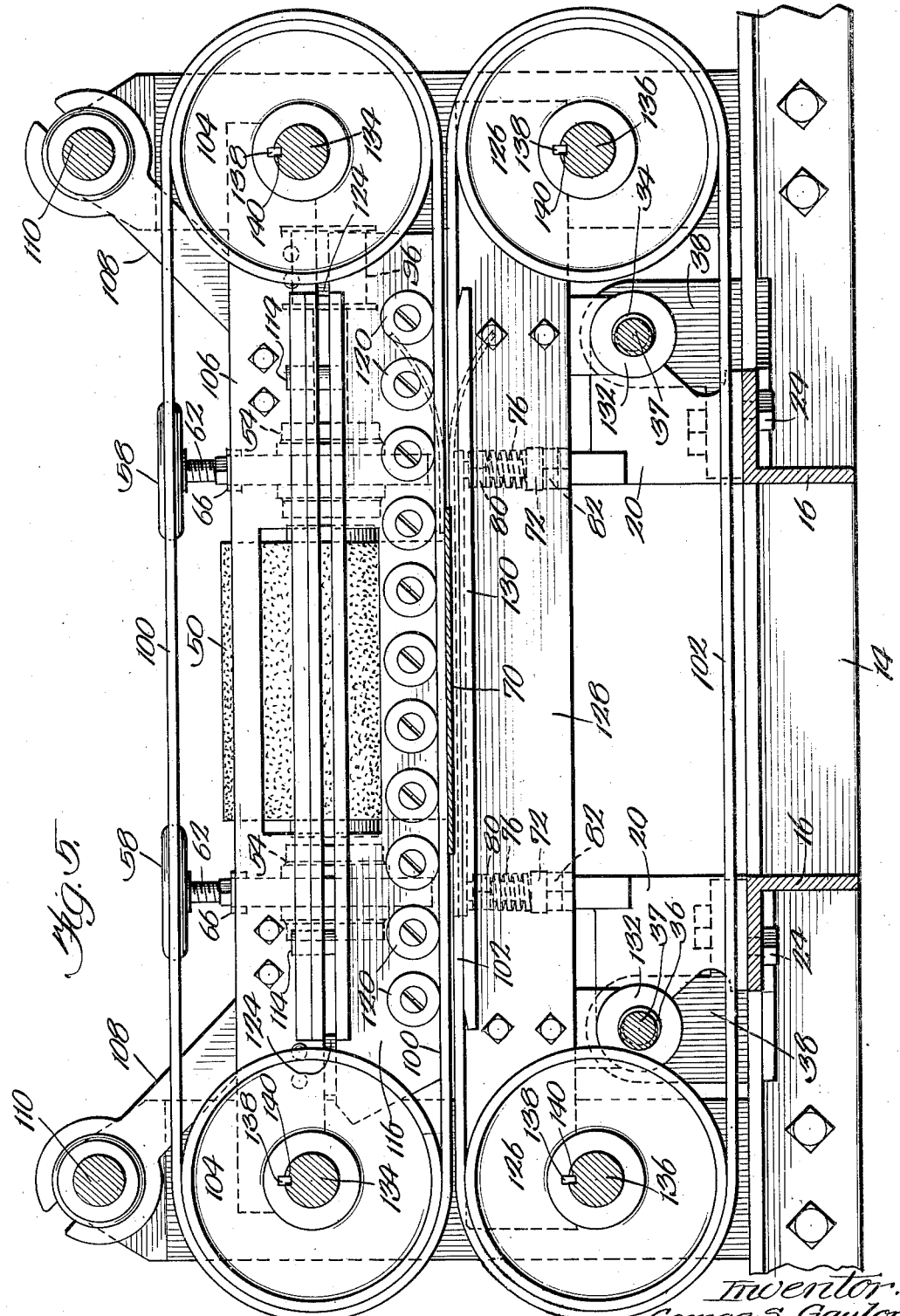

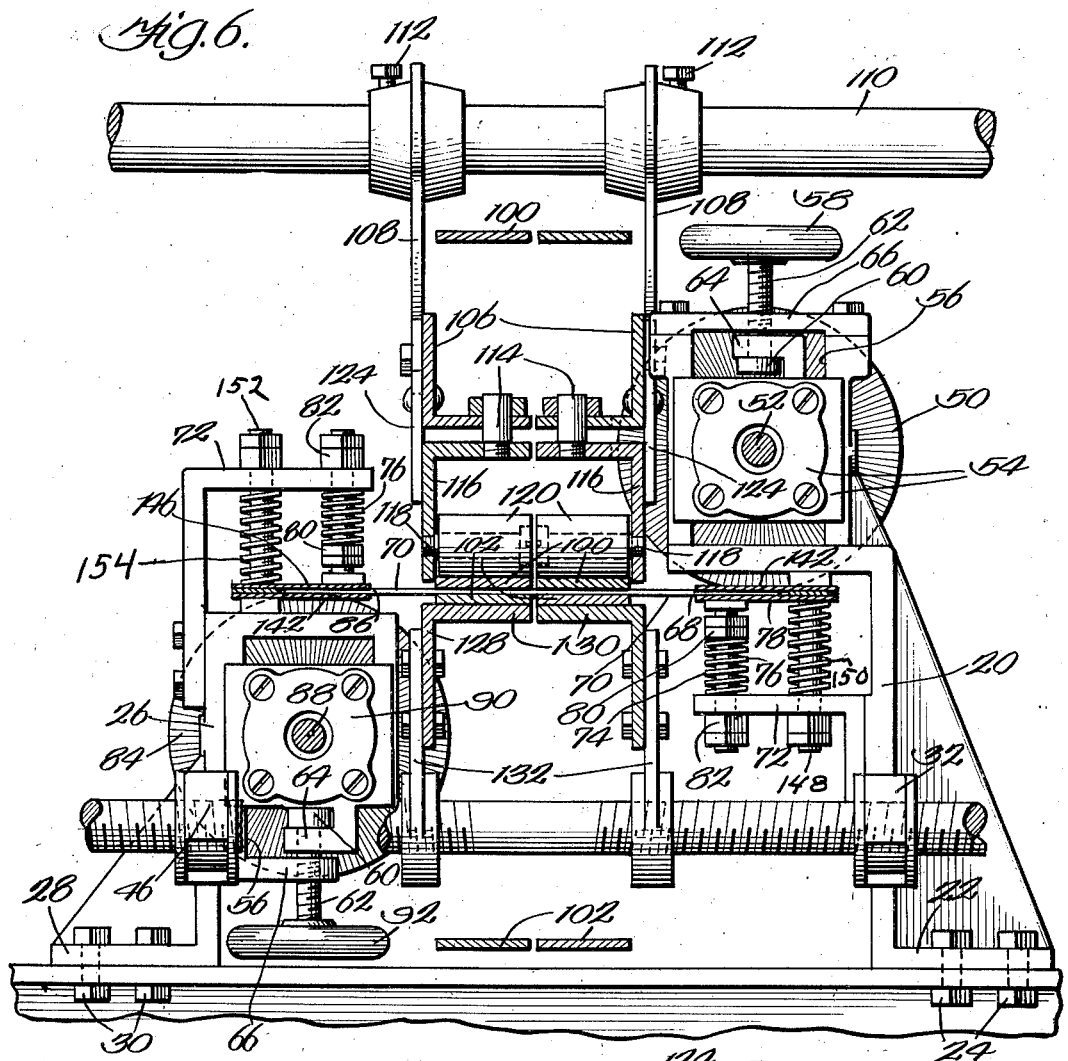

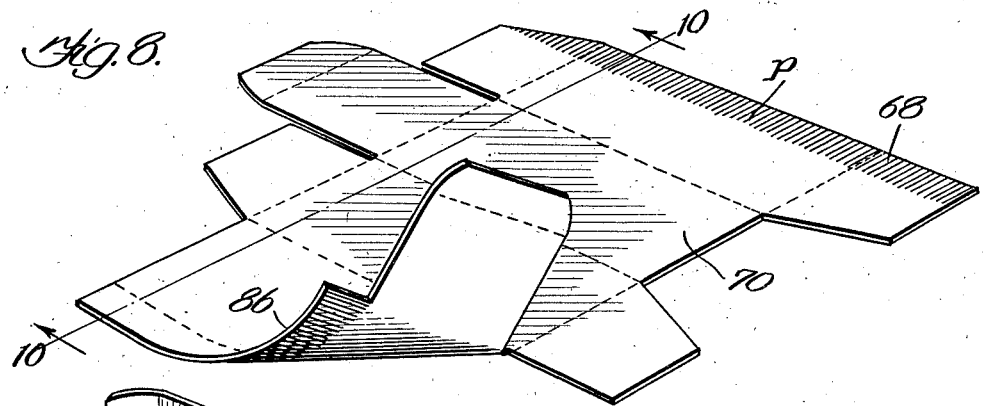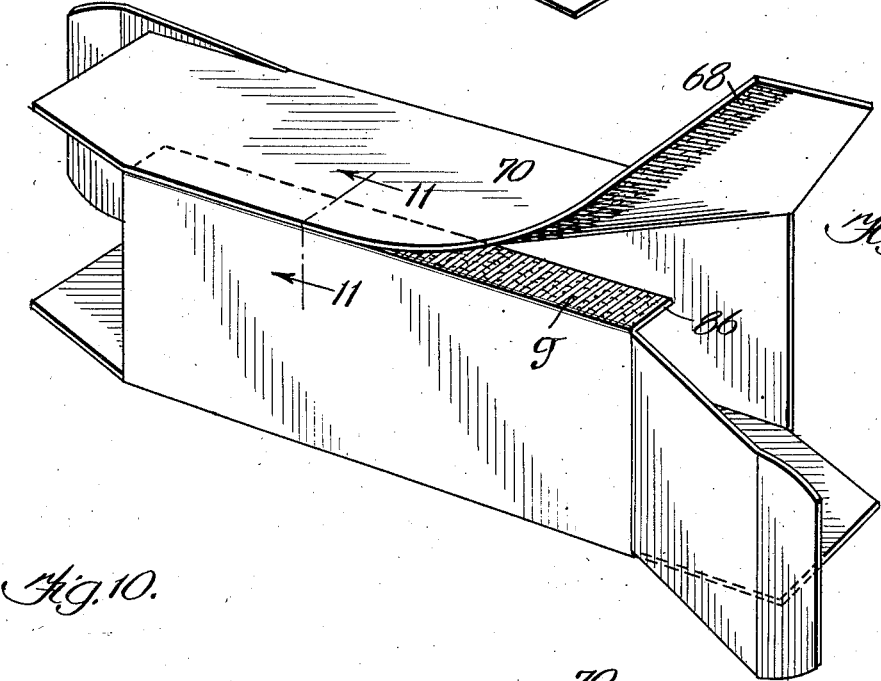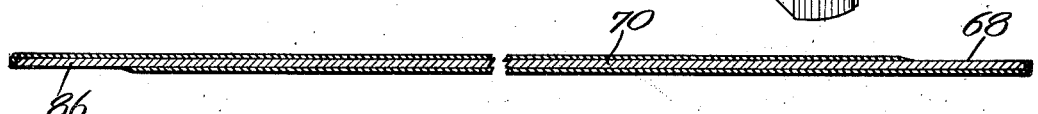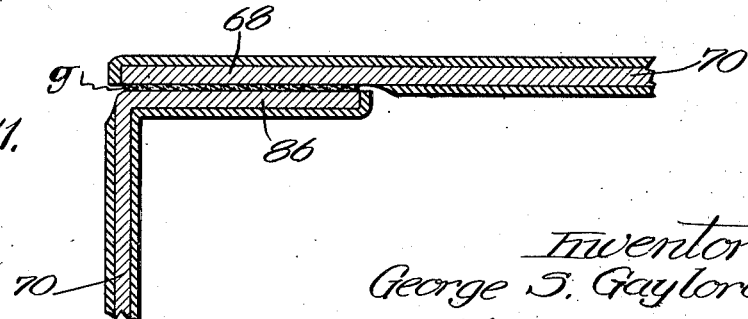

Patented July 21, 1925.

1,546,725

UNITED STATES PATENT OFFICE.

GEORGE S. GAYLORD, OF MENASHA, WISCONSIN, ASSIGNOR TO MENASHA PRINTING & CARTON CO., OF MENASHA, WISCONSIN, A CORPORATION OF WISCONSIN.

MACHINE FOR PREPARING COATED CARTON PARTS FOR GLUING.

Application filed May 29, 1924. Serial No. 716,538.

*To all whom it may concern:*

Be it known that I, GEORGE S. GAYLORD, a citizen of the United States, residing at Menasha, in the county of Winnebago and State of Wisconsin, have invented a certain new and useful Improvement in Machines for Preparing Coated Carton Parts for Gluing, of which the following is a specification.

This invention relates to the common practice of removing grease and liquid resisting surface material such as paraffine from certain predetermined parts, usually the flaps of commercial paper or board carton blanks so that said parts can be glued together to ultimately form a partially or completely sealed coated carton such as is now commonly used in the distribution of butter, icecream, cottage cheese and numerous other food products.

The object of this invention is to provide a machine which will by brushing action remove surface protecting material such as paraffine from the carton flaps to be ultimately glued together. A more particular object is to provide such a machine which is readily adjustable to work on cartons or like products of variable sizes.

The invention consists in means for attaining the foregoing and other objects, which can be easily and cheaply made, which is satisfactory in use and is not readily liable to get out of order. More particularly the invention consists in numerous features and details of construction hereafter more fully set forth in the specification and claims.

Referring to the drawings in which like numerals designate the same parts thruout the several views, Figure 1 is a plan view of a machine illustrating this invention in its preferred form.

Figure 3 is an enlarged sectional side view on the irregular line 3—3 of Figure 1.

Figure 4 is a plan view taken on line 4—4 of Figure 3.

Figure 5 is a central side view on the line 5—5 of Figure 4.

Figure 6 is an end view on the irregular line 6—6 of Figure 3.

Figure 7 is a detail sectional view on the line 7—7 of Figure 3.

Figure 8 shows a carton blank before folding.

Figure 9 shows the blank of Figure 8 in the process of being folded to form a box.

Figure 10 is a sectional detail view on the line 10—10 of Figure 8.

Figure 11 is a section on line 11—11 of Figure 9.

Figure 1:
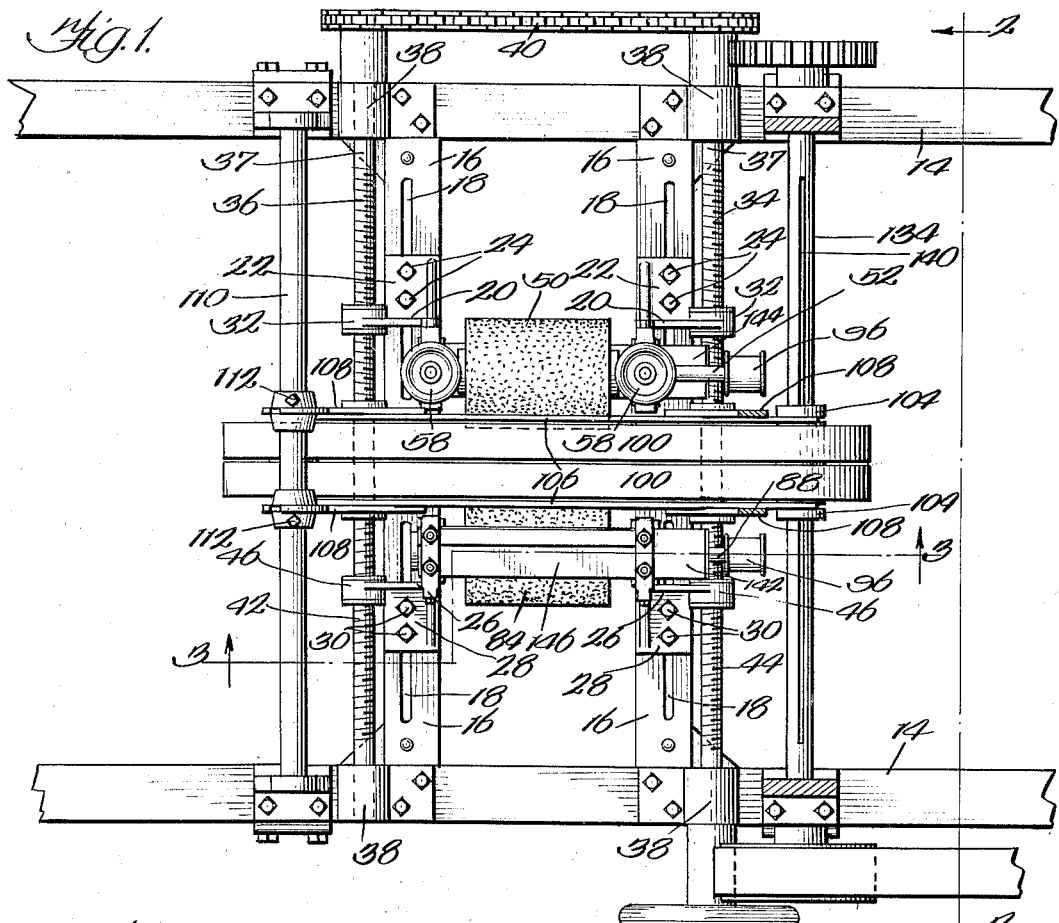
Figure 2:
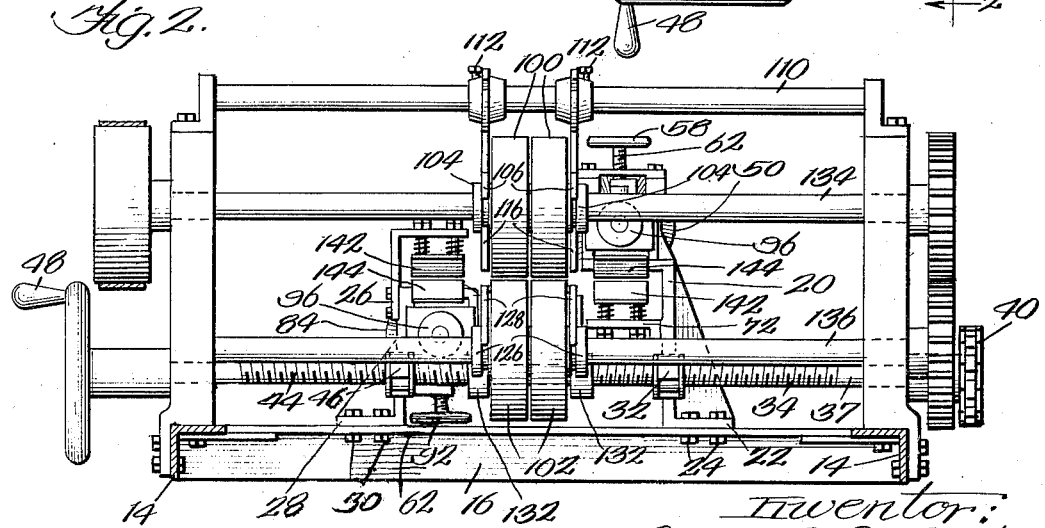
Figure 2 is an end view on line 2—2 of Figure 1.

It may properly be initially explained that the problem solved by this invention is to provide a machine thru which carton blanks 70, Figure 8, may be passed to remove the paraffine surface $p$ from the initially upper surface of flap 68 and from the initially lower surface of flap 86 so that glue $g$ inserted between the treated surfaces, when brought together as shown in Figures 9 and 11 can act efficiently to permanently hold them together.

I will first describe the paraffine removing mechanism and later the carton conveying mechanism.

The entire machine may be carried on any suitable frame or other support, parts of which in the drawings assume the form of parallel side bars 14 connected together by parallel cross beams 16 having therein elongated slots 18. Extending across the beams 16 and supported thereby on one side of the longitudinal central axis of the machine, parallel to side bars 14, is a crosshead 20 having bracket feet 22 resting upon the respective beams 16. This crosshead is slidable on these beams to or from the center line of the machine by virtue of the fact that bolts 24 or other similar devices on the feet 22 slide in certain of the slots 18 heretofore referred to in the beams 16. Similarly mounted on the opposite side of the center of the machine and facing the crosshead 22 is another crosshead 26 having feet 28 resting on the beams 16, bolts 30 carried by said feet 28 slidably entering other slots 18 provided for them in the beams 16.

Extending from the sides of crosshead 20 are screw threaded bearings 32 operatively engaging parallel screws 34 and 36 on shafts suitably journaled in bearings 38 on the side bars 14. These two shafts 37 are operatively connected together by conventional sprocket chain gearing device 40 so that they and consequently the screws 34 and 36 thereon rotate in unison in the same direction with the results that the crosshead 20 moves toward or from the center line of the machine depending upon the direction of rotation of the shafts.

The opposite ends of shafts 37 beyond the center line of the machine are provided with screws 42 and 44 operatively engaging brackets 46 on crosshead 26. The screws 42 and 44 are pitched in the reverse direction from the screws 34 and 36 with the result that simultaneous rotation of the two shafts 37 causes the crosshead 26 to travel in the opposite direction from crosshead 20 and at the same speed. One of the screws 37 is provided outside the side bars 14 with the manually operatable hand wheel 48 and the result of the just described construction is that when the operator rotates this hand wheel 48 in one direction he causes the crossheads 20 and 26 to approach each other and when he rotates the hand wheel in the opposite direction the crossheads separate or move away from each other.

Crosshead 20 is higher than crosshead 26 and carries at its top a horizontally disposed rotatable brush 50 rotating on a shaft 52 parallel to the longitudinal axis of the machine. This brush and its shaft is vertically adjustable at either end by virtue of the fact that the shaft ends are each journaled in a bearing block 54 vertically reciprocable on conventional vertical guides 56 under the action produced by manual rotation of a hand wheel 58 provided for the purpose. As there is one hand wheel 58 at each end of the shaft 52 the operator has full control of the shaft 52 and consequently the brush. Each wheel 58 controls the adjacent crosshead 54 thru the agency of a nut or block 60 on the lower end of a screw 62 carried by the wheel, said block being as shown between the upper surface of the bearing block 54 and below an L-shaped lug 64 on its top. The screw which is threaded into a plate 66 on the top of the crosshead slips freely, without screw threaded engagement, thru this lug 64 with the result that when the parts are in the position shown in Figure 6 the nut 60 bears on the underside of the lug 64 to lift the bearing block 54 and consequently the end of the shaft. When, however, the wheel 58 and screw 62 are rotated in proper direction to cause nut 60 to move downward and bear on the top of block 54 the operator can press that end of the shaft 52 downward with the result that brush 50 is pressed upon the adjacent flap 68 of a carton blank 70.

The crosshead 20 is also provided with laterally extending brackets 72 supporting vertically reciprocable bolts 74 carrying springs 76 which urge them to move the adjacent portion of a horizontal plate 78 carrying the carton flap 68 against brush 50. The amount and intensity of movement of these bolts 74 under the action of spring 76 is adjustably determined by the obvious manipulation of nuts 80 and 82.

In similar manner crosshead 26 carries in its lower portion a brush 84 adapted to engage the underside of a flap 86 of carton blank 70. This brush is mounted upon a shaft 88 corresponding to shaft 52 of brush 50. The ends of this shaft 88 are carried in bearing blocks 90 vertically reciprocable as are blocks 54 under the control of hand wheels 92.

As each end of each shaft 52 and 88 is independently adjustable, it is desirable that in its bearing block 54 or 90 it be provided with a suitable ball bearing construction 94, such for instance as that shown in Figure 3 permitting ready adjustment of the bearing vertically without danger of affecting the efficient rotation of the brush carried by the device. The ends of shafts 52 and 88 are provided with parallel pulleys 96 over which passes a power driven belt of conventional form not shown in the drawing so arranged that brushes 50 and 84 rotate in the same direction with respect to their respective axes and with the result that they brush the respective carton flaps 68 and 86 from the central longitudinal axis to the outside of the machine—in other words—away from the center of the body portion of the carton blanks 70 which is by mechanism hereafter described caused to pass thru the machine under the shaft.

In order to convey cartons 70 one after another thru the machine, under brush 50 and over brush 84, two parallel upper conveyer belts 100 and two parallel lower conveyer belts 102 arranged as shown in the drawing are provided, the lower surfaces of the two upper belts being close enough to the upper surfaces of the two lower belts so that a carton sent in between the upper and lower belts will be firmly gripped by the belts and carried to and beyond operative relation with the brushes. If the machine were dealing with only one width of carton, only one upper and one lower belt would be required, but in order to make a machine which can be adjusted to handle cartons whose bodies are of different widths, the two upper and two lower belts are provided and the respective belts are so mounted that the two upper belts can be separated one from the other and the two lower belts can be separated one from the other, sufficiently to attain this object.

For the purpose just referred to, each upper belt 100 is carried on pulleys or wheels 104 journaled in opposite ends of a horizontal bar 106 sustained upon brackets 108 slidably mounted upon stationary shafts 110 suitably mounted by devices not shown in the drawings across and above the side bars 14 and parallel to the cross beams 16. These brackets 108 are detachably securable in selected position on the shafts 110 by any suitable means, as for instance the set screws 112. Each bar 106 is in the case here shown an angle iron and has thru its lower horizontal flange (Figure 6) two or more reciprocable bolts 114 screw-threaded at their lower ends into the horizontal top flange of a right angled roller carrying bar 116 having projecting from its depending side flange a multiplicity of roller shafts 118 each provided with a roller 120 adapted to bear upon the carton blank passed thru the machine. The weight of the parts is normally sufficient to hold these rollers on the carton, but if for any reason additional force is desired, the bolts 114 may be enclosed with springs placed in the space between the horizontal flanges of bars 106 and 116. Lateral motion of the roller carrying bar 116 with reference to the adjacent bar 106 is in one direction at least prevented by depending fingers 124 attached to the bar 106, as shown in Figure 3.

Each lower belt 102 is sustained and driven by pulleys 126 suitably journaled in an angle iron bar 128 parallel to bar 106 having its upper flange 130 so disposed as to form the table clearly seen in Figure 6 over which upper section of the belt 102 travels,—this to prevent sagging of the belt while carrying carton blank 70. Each angle iron bar 128 is sustained at its opposite ends on depending brackets 132 screw threaded at their lower ends onto adjacent screw threads of shaft 37 controlling the crossheads 20 and 26, heretofore described. The result of the construction just described is that so far as the angle irons 128 and the lower belts 102 are concerned, rotation of hand wheel 48 causes these belts 102 to move toward and from the center of the machine in unison with crossheads when they are moved as heretofore described. This separating adjustment of upper belts 100 is manually made by the operator loosening set screws 112, then moving bars 106 and attached parts to the new and desired position and then re-tightening the set screws 112 on the stationary shafts 110. When the machine is in any given position and it is desired to separate the belts to accommodate a broader carton, the operator can manipulate hand wheel 48 to separate the crossheads and the lower belts and thereafter manually separate the upper belts. In reversing the operation, i. e. starting from a wide adjustment, and moving to a narrower adjustment, it is obviously necessary to first move the belts 100 toward each other to the new position in order to get them out of the way of and permit the moving up of the crossheads 20 and 26 and attached parts.

The lateral adjustment of the respective carrying wheels or pulleys 124 and 126 on the shafts 134 and 136 which sustain them is made possible by the use of any conventional spline 138 and keyway 140 construction. The shafts 134 and 136 are mounted in any conventional manner on the frame of the machine and are propelled either singly or jointly from a source of power not entering the invention outside of the machine. Suitable converging guides 142 and 144 are provided as shown in Figures 7 at the point where the carton flap is approaching the brush to guide it onto the surface of the brush. In the particular case of Figure 3 the guide 142 is integral with the plate 146 against the underside of which brush 84 presses carton flap 86 in exactly the same manner that brush 50 presses flap 68 onto plate 78. It is important to note that the belts are adjustable to confine the carton body quite close to the points of action of the brushes thereby securely holding the flaps for the brushing operation.

*Operation.*

In the complete operation of the machine the operator by methods which have been heretofore fully described, adjusts the belts 100–102 to the proper position to handle the body of cartons from whose flaps of paraffine or similar coating is to be removed. Power is then applied to rotate the shafts 134 and 136 in opposite direction thereby causing belts 100–102 to operatively carry carton blank 70 fed between them in between the guides 142 and 144 and thence into contact with the brushes. Power having been also supplied to rotate the brushes 58 and 84 they energetically engage the adjacent surfaces of the carton flaps 68 and 86 to remove the paraffine $p$ therefrom while the carton is passing thru the machine and out from between the belts. The operator takes a carton delivered from the machine applies the glue $g$ to the brushed surfaces and assembles the flaps as shown in Figures 9 and 11 to form a finished box.

Slidable bolt 148 equipped with spring 150 is provided as an additional guide for plate 78 and similar parts 152 and 154 are provided in connection with plate 146.

Having thus described my invention what I claim as new and desire to secure by Letters Patent, is:—

1. In mechanism of the class described, in combination, means for conveying a carton blank and means for brushing surface material from a portion of the surface of the blank while being so conveyed.

2. In mechanism of the class described, in combination, means for conveying a carton blank and means for brushing surface material from opposite surface portions of the blank while being so conveyed.

3. In mechanism of the class described, in combination, means for conveying a carton blank and means for brushing surface material from opposite surface portions on opposite border portions of the blank while being so conveyed.

4. In mechanism of the class described in combination, means for conveying a carton blank confining all except certain border portions thereof and means for brushing surface material from one of the non-confined portions while the carton is being so conveyed.

5. In mechanism of the class described, in combination, means for conveying a carton blank confining all except certain border portions thereof and means for brushing surface material from opposite unconfined border portions of said carton blank portions while the carton is being so conveyed.

6. In mechanism of the class described, in combination, means for conveying a carton blank confining portions of a blank inwardly of certain unconfined border portions thereof and means for brushing surface material from unconfined opposite border portions of the carton while the carton is being so conveyed.

7. In mechanism of the class described, in combination, means for conveying a carton blank confining all except certain border portions thereof, means brushing surface material from one of the non-confined portions while the carton is being so conveyed, and means adjusting the machine to take cartons of different widths without changing the confinement of the blank adjacent to the border portions.

8. In mechanism of the class described, in combination, means for conveying a carton blank confining all except certain border portions thereof, means brushing surface material from opposite surface portions of non-confined portions while the carton is being so conveyed, and means adjusting the machine to take cartons of different widths without changing the confinement of the blank adjacent to the border portions.

9. In mechanism of the class described, in combination, means for conveying a carton blank confining all except certain border portions thereof, means orushing surface material from opposite surface portions of non-confined portions on opposite border portions of the carton while the carton is being so conveyed, and means adjusting the machine to take cartons of different widths without changing the confinement of the blank adjacent to the border portions.

10. In mechanism of the class described, a rotatable brush, and means for carrying a blank carton in the direction of the axis of the brush along the brush in a relation causing the brush to remove surface material from the carton.

11. In mechanism of the class described, a rotatable brush, means carrying a carton blank in the direction of the axis of the brush along the brush, and yielding means holding the carton blank in engagement with the brush.

12. In mechanism of the class described, a rotatable brush, means for carrying a carton blank in the direction of the axis of the brush along the brush, yielding means holding the carton blank in engagement with the brush, and means varying the pressure of said yieldable holding means.

13. In mechanism of the class described, two separated parallel rotatable brushes, means for passing a carton blank lengthwise of said brushes so that one brush engages one side of one border portion while the other brush engages the opposite side of an opposite border portion of the carton blank, and means for rotating said brushes to remove material from the carton blank portions so engaged.

14. In mechanism of the class described, two separated parallel rotatable brushes, means for passing a carton blank lengthwise of said brushes so that one brush engages one side of one border portion while the other brush engages the opposite side of an opposite border portion of the carton blank, and means for rotating said brushes to remove material from the carton blank portions so engaged, the direction of rotation being such as to carry the removed material outward from the center of the carton.

15. In mechanism of the class described, two separated parallel rotatable brushes, means for passing a carton blank lengthwise of said brushes so that one brush engages one side of one border portion while the other brush engages the opposite side of an opposite border portion of the carton blank, means for rotating said brushes to remove material from the carton blank portions so engaged, and yielding means for forcing border portions of the carton blank into contact with the respective brushes.

16. In mechanism of the class described, two separated parallel rotatable brushes, means for passing a carton blank lengthwise of said brushes so that one brush engages one side of one border portion while the other brush engages the opposite side of an opposite border portion of the carton blank, means for rotating said brushes to remove material from the carton blank portions so engaged, the direction of rotation being such as to carry removed material outward from the center of the carton blank, and yielding means for forcing border portions of the carton blank into contact with the respective brushes.

17. In mechanism of the class described, two separated parallel rotatable brushes, means for passing a carton blank lengthwise of said brushes so that one brush engages one side of one border portion while the other brush engages the opposite side of an opposite border portion of the carton blank, means for rotating said brushes to remove material from the carton blank portions so engaged, and means for varying the distance of separation between the brushes to accommodate carton blanks of different widths.

18. In mechanism of the class described, two separated parallel rotatable brushes, means for passing a carton blank lengthwise of said brushes so that one brush engages one side of one border portion while the other brush engages the opposite side of an opposite border portion of the carton blank, means for rotating said brushes to remove material from the carton blank portions so engaged, the direction of rotation being such as to carry removed material outward from the center of the carton, and means for varying the distance of separation between the brushes to accommodate carton blanks of different widths.

19. In mechanism of the class described, two separated parallel rotatable brushes, means for passing a carton blank lengthwise of said brushes so that one brush engages one side of one border portion while the other brush engages the opposite side of an opposite border portion of the carton blank, means for rotating said brushes to remove material from the carton blank portions so engaged, and screw mechanism for varying the distance of separation between the brushes to accommodate carton blanks of different widths.

20. In mechanism of the class described, two separated parallel rotatable brushes, means for passing a carton blank lengthwise of said brushes so that one brush engages one side of one border portion while the other brush engages the opposite sides of an opposite border portion of the carton blank, means for rotating said brushes to remove material from the carton blank portions so engaged, the direction of rotation being such as to carry removed material outward from the center of the carton blank, and screw mechanism for varying the distance of separation between the brushes to accommodate carton blanks of different widths.

21. In mechanism of the class described, means to abrase surface material from a carton blank, and means to hold a carton blank in operative relation to said abrasing means, one of said means being movable along the other.

22. In mechanism of the class described, rotatable means to abrase surface material from a carton blank, and means to hold a carton blank in operative relation to said abrasing means, one of same means being movable along the other.

23. In mechanism of the class described, means to abrase surface material from a carton blank, and a pair of belts between which a carton blank is adapted to be held in operative relation to said abrasing means.

24. In mechanism of the class described, means to brush surface material from a carton blank, and means to convey a carton blank along said brushing means, said last mentioned means being operable to hold a carton blank in operative relation to said brushing means while conveying such blank with respect thereto.

25. In mechanism of the class described, a pair of devices to brush surface material from a carton blank, and means between said devices for holding a carton blank operatively positioned with respect thereto.

26. In mechanism of the class described, a pair of devices to brush surface material from a carton blank, and means between said devices for holding a carton blank operatively positioned with respect thereto, said means being operable to move the carton along said brushing devices.

27. In mechanism of the class described, a pair of devices to abrase surface material from a carton blank, and a pair of belts between which a carton blank is adapted to be held in operative relation to said abrasing devices, said belts being located between said abrasing devices.

28. In mechanism of the class described, a rotatable device to abrase surface material from a carton blank held in operative relation to said device and means for independently adjusting either end of said device towards and away from a carton blank held operatively disposed with respect thereto.

29. In mechanism of the class described, in combination, carton blank conveying means adjustable to accommodate carton blanks of different widths, said means being effective in any adjusted position thereof to confine portions of a carton blank inwardly of certain unconfined border portions thereof, and means for brushing surface material from one of the unconfined border portions of a carton blank while it is being conveyed.

30. In mechanism of the class described, in combination, carton blank conveying means adjustable to accommodate carton blanks of different widths, said means being effective in any adjusted position thereof to confine portions of a carton blank inwardly of certain unconfined border portions thereof, and means for brushing surface material from opposite unconfined border portions of a carton blank while it is being conveyed.

31. In mechanism of the class described, in combination, carton blank conveying means adjustable to accommodate carton blanks of different widths, said means being effective in any adjusted position thereof to confine portions of a carton blank inwardly of certain unconfined border portions thereof, and means for brushing surface material from opposite surfaces of a blank at opposite unconfined border portions thereof respectively while the blank is being conveyed.

32. In mechanism of the class described, a rotatable shaft, an abrasing device on said shaft, and means for conveying a carton blank in the direction of the axis of said shaft along said abrasing device whereby the latter will operate to remove surface material from the blank.

33. In mechanism of the class described, a pair of rotatable, parallel spaced shafts, an abrasing device carried by each shaft, and means between said shafts for conveying a carton blank in the direction of their axes whereby said abrasing devices will operate to remove surface material from opposite border portions of the blank.

34. In mechanism of the class described, a pair of horizontal, rotatable, parallel, laterally spaced shafts located one above the other, an abrasing device carried by each shaft, and means between said shafts for conveying a carton blank in the direction of their axes whereby said abrasing devices operate to remove surface material from opposite faces of opposite border portions thereof, respectively.

In witness whereof, I have hereunto subscribed my name.

GEORGE S. GAYLORD.